(12) United States Patent
Itoh et al.

(10) Patent No.: US 7,672,651 B2
(45) Date of Patent: Mar. 2, 2010

(54) TUNER CIRCUIT

(75) Inventors: Hiroya Itoh, Kawasaki (JP); Yasuhiro Sugano, Ebina (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 930 days.

(21) Appl. No.: 11/453,036

(22) Filed: Jun. 15, 2006

(65) Prior Publication Data

US 2006/0285022 A1 Dec. 21, 2006

(30) Foreign Application Priority Data

Jun. 17, 2005 (JP) ............................. 2005-178155

(51) Int. Cl.
*H04B 1/18* (2006.01)
(52) U.S. Cl. .................... 455/150.1; 455/307; 455/339; 348/725
(58) Field of Classification Search .............. 455/150.1, 455/179.1, 180.1, 180.2, 188.1, 188.2, 307, 455/333, 339; 348/725, 731
See application file for complete search history.

(56) References Cited

U.S. PATENT DOCUMENTS 6,118,499 A * 9/2000 Fang .......................... 348/726
6,397,048 B1 * 5/2002 Toda .......................... 455/307
7,081,926 B2 * 7/2006 Jeong et al. ................. 348/678

FOREIGN PATENT DOCUMENTS

| JP | 3178382 | 4/2001 |
|---|---|---|
| JP | 2003-338767 | 11/2003 |

* cited by examiner

*Primary Examiner*—Quochien B Vuong
(74) *Attorney, Agent, or Firm*—Oblon, Spivak, McClelland, Maier & Neustadt, L.L.P.

(57) ABSTRACT

A high frequency signal selected via a pre-filter is inputted to first and second frequency conversion circuits together with a local oscillation signal. The first and second frequency conversion circuits each output a difference frequency component between both input signals. An output signal of the first frequency conversion circuit is inputted to an intermediate frequency filter while an output of the intermediate frequency filter is inputted to an amplifier. An output signal of the first frequency conversion circuit is inputted to an amplifier. The amplifier selects and amplifies any one of an intermediate frequency signal outputted from the intermediate frequency signal and an output signal of the second frequency conversion circuit, and thereafter, output it.

20 Claims, 5 Drawing Sheets

F I G. 1

Pre-filter
characteristic
(peak : fRF)

F I G. 2A

Intermediate frequency
filter characteristic
(peak : fIF)

F I G. 2B

Output terminal
combined characteristic
(peak : fIF)

F I G. 2C

Pre-filter
characteristic
(peak : fRF)

F I G. 3A

Intermediate frequency
filter characteristic
(peak : fIF)

F I G. 3B

Output terminal
combined characteristic
(peak : fIF)

Pre-filter characteristic
(peak : fRF)

FIG. 5A

Intermediate frequency
filter characteristic
(peak : fIF)

FIG. 5B

Output terminal
combined characteristic
(peak : fIF)

FIG. 5C

Output terminal
combined characteristic
(peak : fIF)

TUNER CIRCUIT

CROSS-REFERENCE TO RELATED APPLICATIONS

This application is based upon and claims the benefit of priority from prior Japanese Patent Application No. 2005-178155, filed Jun. 17, 2005, the entire contents of which are incorporated herein by reference.

BACKGROUND OF THE INVENTION

1. Field of the Invention

The present invention relates to a tuner circuit used for a television receiver. In particular, the present invention relates to a tuner circuit, which is adaptable for controlling a high (radio) frequency filter characteristic.

2. Description of the Related Art

In television receivers for VHF and UHF bands, a tuner circuit converts a received signal ranging from about 100 MHz to 1 GHz into an intermediate frequency signal having tens of MHz. In the process of manufacturing the tuner circuit, there is provided a pre-filter included in a front stage of the tuner circuit, that is, a received signal amplifying stage. The pass band characteristic of the pre-filter is tuned and controlled to a frequency of the received signal. In this case, the output signal frequency characteristic of the tuner circuit is observed using a network analyzer. The tuner circuit includes an intermediate frequency filter. For this reason, it is difficult to measure the pass bad characteristic of the pre-filter using a signal passed through the tuner circuit.

Japanese Patent No. 3178382 has descriptions related to the following method. According to the method, a resonator of the intermediate frequency filter in the tuner circuit is electrically short-circuited to control the characteristic of the pre-filter. By doing so, the characteristic of the intermediate frequency filter is made flat as much as possible. However, according to the foregoing method, it is impossible to fully remove an influence on the characteristic of the intermediate frequency filter. In other words, the frequency characteristic of a tuner output signal receives the influence on the characteristic of the intermediate frequency filter. In addition, the work of controlling the characteristic of the pre-filter becomes troublesome.

BRIEF SUMMARY OF THE INVENTION

According to one aspect of the present invention, there is provided a tuner circuit including a pre-filter receiving a received high frequency signal, and outputting a high frequency signal having a desired frequency band, a local oscillator generating a local oscillation signal, a first frequency conversion circuit receiving a high frequency signal outputted from the pre-filter and the local oscillation signal to output a signal having a difference frequency component between the both signals, an intermediate frequency filter receiving an output signal of the first frequency conversion circuit, and selectively passing a signal having a desired intermediate frequency band to output an intermediate frequency signal, a second frequency conversion circuit receiving a high frequency signal outputted from the pre-filter and the local oscillation signal to output a signal having a difference frequency component between the both signals, and an amplifier receiving the intermediate frequency signal and an output signal of the second frequency conversion circuit to select and amplify any one of the both signals, and thereafter, to output the selected and amplified signal.

DETAILED DESCRIPTION OF THE INVENTION

First, a comparative example will be explained below prior to the description relevant to embodiments of the present invention. In the comparative example, and embodiments described later, the same reference numerals are used to designate components common to each other, and the overlapping explanation is omitted.

Comparative Example

Figure 1:
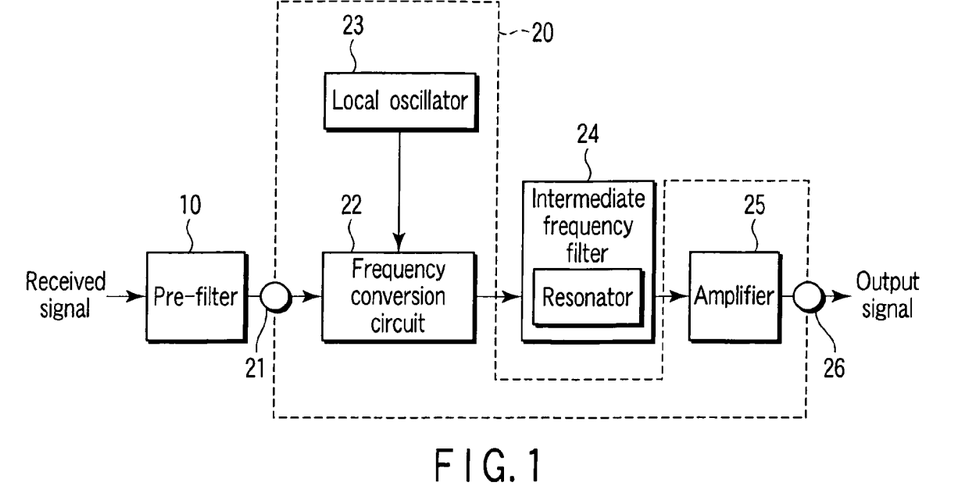
FIG. 1 is a block diagram showing a tuner circuit given as a comparative example.

FIG. 1 is a block diagram showing a tuner circuit given as a comparative example. For example, a TV receiver is provided with the foregoing tuner circuit. A received high-frequency signal is supplied to an input terminal 21 of an integrated circuit chip 20 given as the tuner circuit the via a pre-filter 10 included in a received signal amplifying unit. The signal supplied to the integrated circuit chip 20 is inputted to a frequency conversion circuit 22 to mix it with a local oscillation signal generated by a local oscillator 23. Then, the output of the frequency conversion circuit 22 is supplied to an intermediate filter 24, and thereby, an intermediate frequency signal is extracted. The intermediate frequency signal thus extracted is amplified via an amplifier 25, and thereafter, outputted from an output terminal 26 of the integrated circuit chip 20.

The frequency characteristic of the output signal of the integrated circuit chip 20 depends on characteristics combining that of the intermediate frequency filter 24, and not single characteristic of the pre-filter 10. For this reason, the characteristic of the pre-filter 10 is not observed from the output signal of the tuner circuit.

Figure 2A:
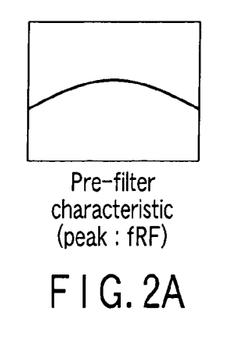
FIG. 2A to FIG. 2C are characteristic charts showing the frequency characteristics of principal parts of the tuner circuit of FIG. 1 in a normal operation.
Figure 2B:
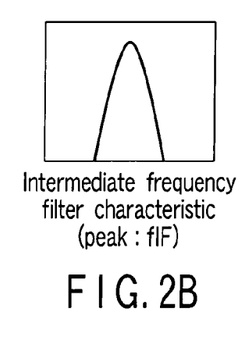
Figure 2C:
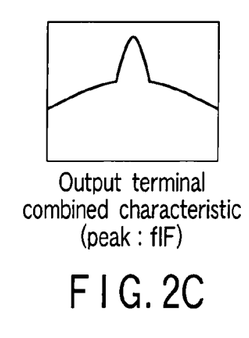

The foregoing matter will be explained below in detail. FIG. 2A to FIG. 2C are characteristic charts showing the frequency characteristics of principal parts of the tuner circuit shown in FIG. 1 in a normal operation. FIG. 2A shows a single frequency characteristic of the pre-filter 10. FIG. 2B shows a single frequency characteristic of the intermediate frequency filter 24. FIG. 2C shows a combined characteristic integrating the characteristic of the pre-filter 10 with that of the intermediate frequency filter 24. In other words, FIG. 2C shows the frequency characteristic of a tuner output signal. In the frequency characteristic of the tuner output signal, a peak frequency fRF in the frequency characteristic of the pre-filter 10 is converted into fIF via frequency conversion effect by a frequency conversion circuit 22.

The values of circuit elements built in the pre-filter 10 are controlled in order to remove an interference signal having an unnecessary frequency band, and to pass a desired received signal only. In this case, the values are controlled so that the peak frequency coincides with a frequency fRF of the desired received signal. The local oscillator 23 generates an fRF+fIF local oscillation signal having a frequency fLO shifted from the frequency fFR of the received signal by an intermediate frequency fIF in this example. Then, the frequency conversion circuit 22 mixes the received signal with the local oscillation signal, and thereafter, outputs a signal having two frequencies. One is the difference component between the foregoing two signals, that is, fIF. Another is the sum component, that is, (2×fRF+fIR). The intermediate frequency filter 24 has a frequency characteristic such that an acute pass band is given in the vicinity of the fIF. The intermediate frequency filter 24 extracts a necessary fIF component from the output signal of the frequency conversion circuit 22.

The output signal of the tuner circuit is observed in a normal operation. As seen from FIG. 2C, a combined characteristic integrating the characteristic of the pre-filter 10 with that of the intermediate frequency filter 24 is observed. As described above, in a state that the frequency characteristic of the intermediate frequency filter 24 is overlapped, the following disadvantage is given. Even if the pass band characteristic of the pre-filter 10 is controlled to tune to the frequency of the received signal while observing the tuner output signal, the peak frequency of the pre-filter 10 is not accurately controlled.

Figure 3A:
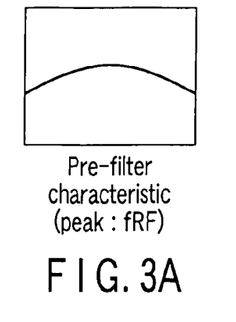
FIG. 3A to FIG. 3C are characteristic charts showing the frequency characteristics of principal parts of the tuner circuit of FIG. 1 in a control operation.
Figure 3B:
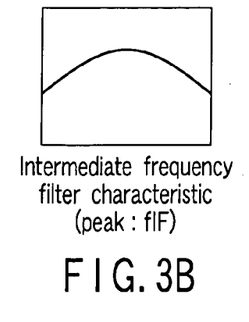
Figure 3C:
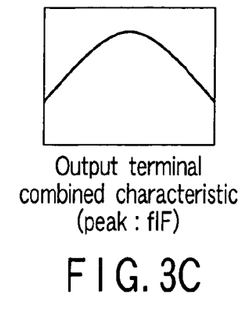

In a characteristic control operation of the pre-filter 10, a resonator of the intermediate frequency filter 24 is electrically short-circuited to make flat the characteristic of the intermediate frequency filter 24. FIG. 3A to FIG. 3C shows the frequency characteristics of principal parts of the tuner circuit shown in FIG. 1 in a control operation. Similar to the cases of FIG. 2A to FIG. 2C, FIG. 3A shows a single frequency characteristic of the pre-filter 10. FIG. 3B shows a single frequency characteristic of the intermediate frequency filter 24. FIG. 3C shows the frequency characteristic of the tuner output signal. According to a comparison in characteristic between FIG. 3A and FIG. 3C, there exists the difference between the foregoing both cases. That is, the frequency characteristic of the tuner output signal receives an influence on that of the intermediate frequency filter 24.

First Embodiment

Figure 4:
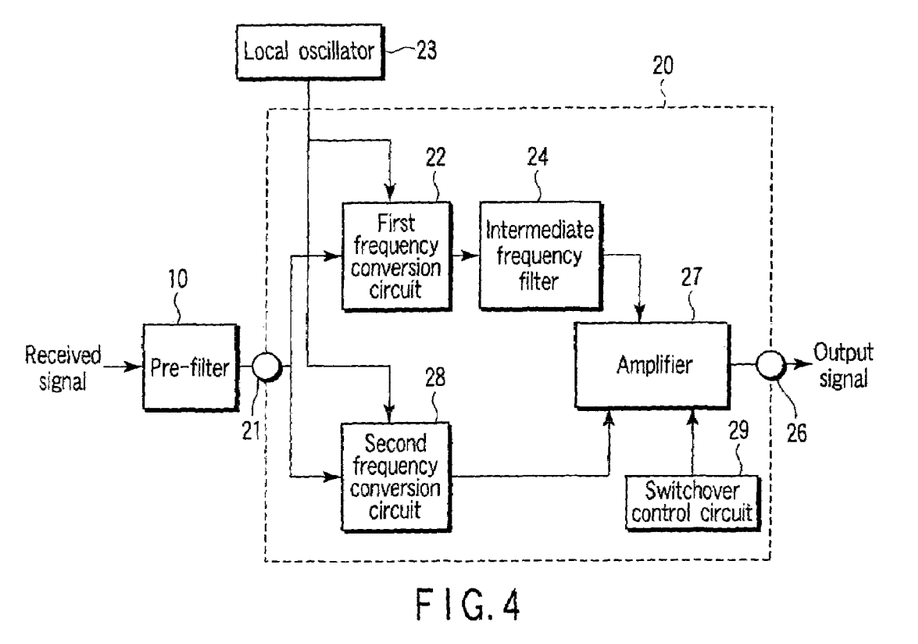
FIG. 4 is a block diagram showing a tuner circuit according to a first embodiment of the present invention.

FIG. 4 shows a tuner circuit according to a first embodiment of the present invention. The tuner circuit shown in FIG. 4 differs from that shown in FIG. 1 in the following points. Specifically, an integrated circuit chip 20 is additionally provided with a signal through system. The signal through system switches the signal path between normal and control operations to input an input signal from a pre-filter 10 to an amplifier 27. The amplifier 27 has a function of selecting two input paths and amplifying a received signal.

A received television signal is supplied to an input terminal 21 of the integrated circuit chip 20 given as a tuner circuit via the pre-filter 10 included in a received signal amplifying unit. The signal supplied to the integrated circuit chip 20 is inputted to a first frequency conversion circuit 22. In the first frequency conversion circuit 22, the signal is mixed with a local oscillation signal generated via a local oscillator 23 using phase-locked loop. An intermediate frequency signal generated here is extracted via an intermediate frequency filter 24. Thereafter, the intermediate frequency signal is amplified via the amplifier 27, and then, outputted from an output terminal 26.

The integrated circuit chip 20 is newly provided with a second frequency conversion circuit 28 having the same configuration as the first circuit 22 and a switchover control circuit 29. In the second frequency conversion circuit 28, a received signal supplied from the input terminal 21 of the integrated circuit chip 20 is brunched and inputted to there. The local oscillation signal generated via a local oscillator 23 is further inputted to the second frequency conversion circuit 28. The received signal inputted to the second frequency conversion circuit 28 is mixed with the local oscillation signal.

The operation of the amplifier 27 is controlled via the switchover control circuit 29. The amplifier 27 selects and amplifies a signal from the intermediate frequency filter 24 in a normal operation. On the other hand, the amplifier 27 selects and amplifies a signal from the second frequency conversion circuit 28 in a control operation.

According to the foregoing configuration of the tuner circuit of FIG. 4, the integrated circuit chip 20 is provided with fist and second frequency conversion circuits 22, 28, intermediate frequency filter 24 and switchover control circuit 29. The local oscillator 23 is provided outside the integrated circuit chip 20. In this case, the following configuration may be employed. Specifically, the foregoing switchover control circuit 29 and intermediate frequency filter 24 are provided outside the integrated circuit chip 20 while the local oscillator 23 is provided therein.

Figure 5A:
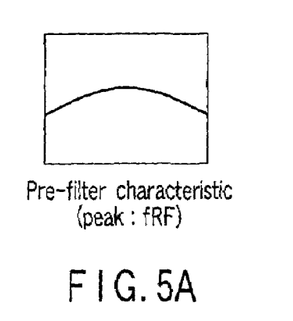
FIG. 5A to FIG. 5D are characteristic charts showing the frequency characteristics of principal parts of the tuner circuit of FIG. 4 in a normal operation and a control operation.
Figure 5B:
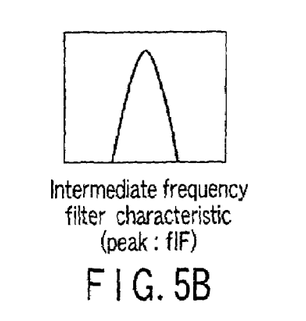
Figure 5C:
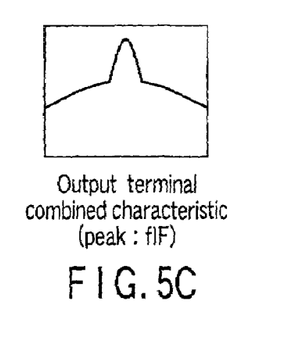
Figure 5D:
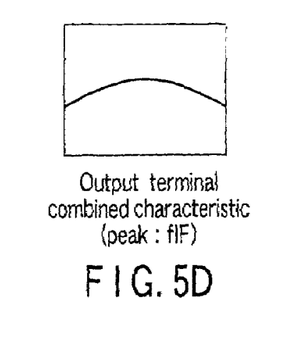

FIG. 5A to FIG. 5D shows the frequency characteristics of principal parts of the tuner circuit shown in FIG. 4 in normal and control operations. FIG. 5A shows a single frequency characteristic of the pre-filter 10. FIG. 5B shows a single frequency characteristic of the intermediate frequency filter 24. FIG. 5C shows a combined characteristic integrating the characteristic of the pre-filter 10 with that of the intermediate frequency filter 24 in a normal operation. FIG. 5D shows the frequency characteristic of the tuner output signal in a control operation.

The operation of the tuner circuit will be explained below.

The tuner circuit of FIG. 4 has the same operation as the tuner circuit given as a comparative example in the normal operation. Specifically, the local oscillator 23 generates a local oscillation signal having a frequency fLO (fRF+fIF in this embodiment) shifting from a frequency fRF of the received signal by an intermediate frequency fIF. First and second frequency conversion circuits 22 and 28 individually mix the received signal with the local oscillation signal. Then, these circuits 22 and 28 individually output a signal containing two frequencies (waveforms); namely, the difference component fIF between both signals and the sum component (2×fRF+fIF).

The intermediate frequency filter 24 has the frequency characteristic having acute pass band in the vicinity of fIF. The filter 24 extracts necessary fIF component from the output signal of the first frequency conversion circuit 22. The amplifier 27 selects and amplifies the output of the intermediate frequency filter 24. In that time, a tuner output signal from the output terminal 26 is observed using a network analyzer. As a result, shown in FIG. 5C, a combined characteristic integrating the characteristic of the pre-filter 10 with that of the intermediate frequency filter 24 is observed.

On the contrary, the following control operation is made in the process of manufacturing the tuner circuit. According to the control operation, the pass band characteristic of the pre-filter 10 is tuned to a frequency of the received signal while observing the frequency characteristic of a tuner output signal. In the control operation, an input signal of the amplifier 27 is switched into a signal outputted from the second frequency conversion circuit 28, that is, a through signal bypassing the intermediate frequency filter 24. In this case, the amplifier 27 amplifies a through signal passing a path containing no frequency characteristic of the intermediate frequency filter 24. As a result, the observed frequency characteristic of the tuner output signal becomes equivalent to the single characteristic of the pre-filter 10 shown in FIG. 5A, as seen from FIG. 5D. However, the frequency relationship is reversed in high and low, and the center frequency is different. Therefore, the characteristic of the pre-filter 10 is observed using the tuner output signal outputted from the output terminal 26. By doing so, the work of controlling the output characteristic of the pre-filter 10 is readily done.

Figure 6:
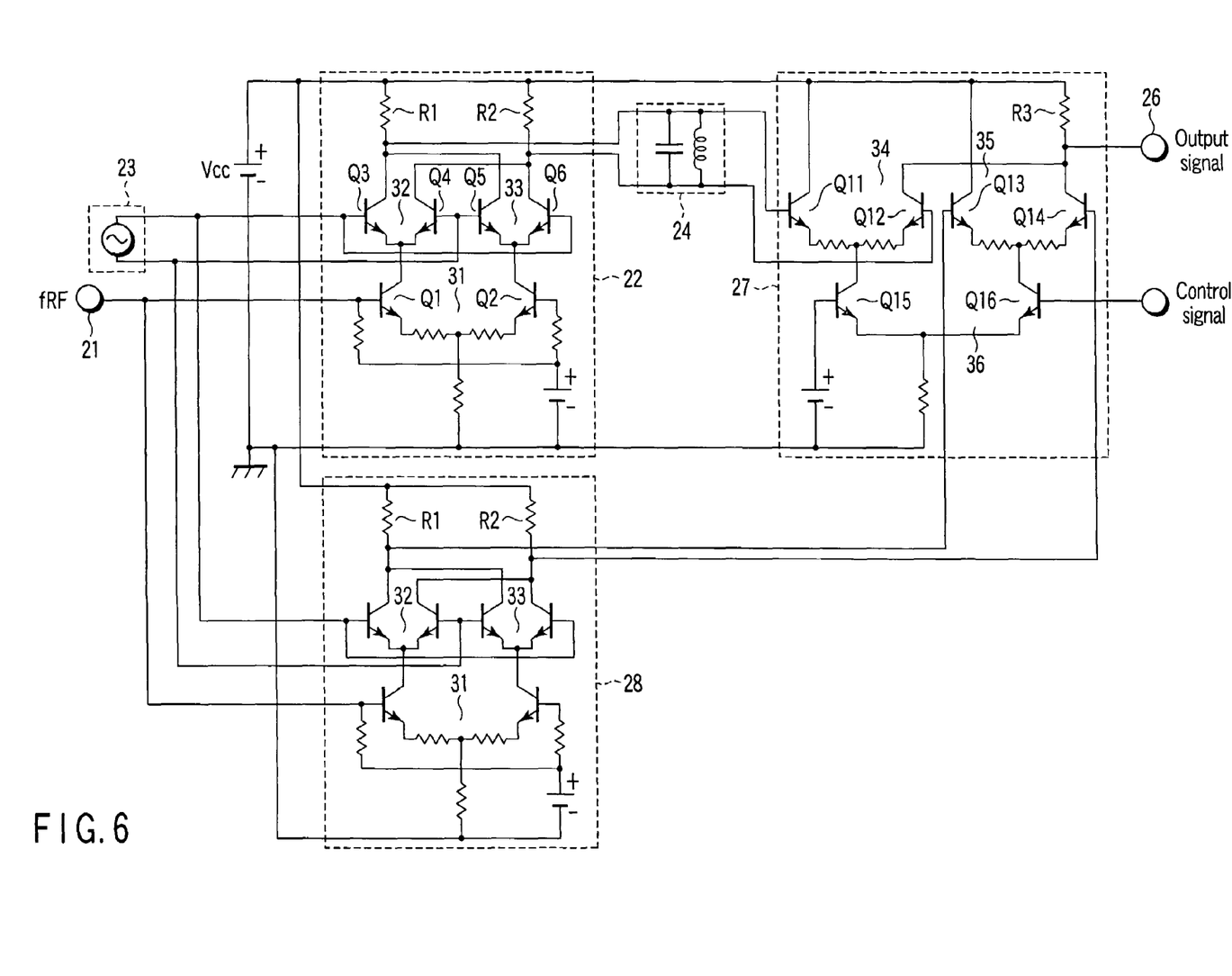
FIG. 6 is a block diagram showing the detailed configuration of the tuner circuit of FIG. 4.

FIG. 6 shows the detailed circuit configuration of the tuner circuit shown in FIG. 4. In FIG. 6, there are shown the input terminal 21, the first and second frequency conversion circuits 22 and 28, a part of the local oscillator 23, the intermediate frequency filter 24, the output terminal 26 and the amplifier 27. In this case, the input terminal 21 is supplied with a high frequency signal selected via the pre-filter 10.

The first frequency conversion circuit 22 includes a generally double balance mixing circuit, which readily stabilizes the characteristic when being made into an integrated circuit. The double balance mixing circuit is composed of a differential circuit. The differential circuit includes differential pairs 31 to 33, and load resistance elements R1 and R2. The differential pair 31 includes NPN transistors Q1 and Q2, and the differential pair 32 includes NPN transistors Q3 and Q4, and the differential pair 33 includes NPN transistors Q5 and Q6. The differential pair 31 is supplied with a received signal fRF from the input terminal 21. The differential pairs 32 and 33 are supplied with a local oscillation signal fLO (=fRF+fIR) from the local oscillator 23. The frequency of the received signal fRF is converted via the differential pairs 31 and 32. Then, a differential signal containing two waveforms, fIF component and (2×fRF+fIF) component is outputted from each one terminal of load resistance elements R1 and R2.

The intermediate frequency filter 24 includes a parallel resonator circuit composed of a capacitor and a coil. The intermediate frequency filter 24 has an acute pass band in the vicinity of the component fIF; therefore, it resonates with the fIF, and thus, transfers the fIF component only to the next stage.

The second frequency conversion circuit 28 includes the same double balance mixing circuit as the first frequency conversion circuit 22. Like the first circuit, the double balance mixing circuit is composed of a differential circuit which includes differential pairs 31 to 33 and load resistance elements R1 and R2. The second frequency conversion circuit 28 mixes the received signal fRF with the local oscillation signal fLO to output a differential signal containing two waveforms, fIF component and (2×fRF+fIF) component.

The amplifier 27 is a 2-input and 1-output amplifier, and selects one of two input signals, and amplifies the selected signal, and thereafter outputs the amplified signal from the output terminal 26. The amplifier 27 includes differential pairs 34 to 36, and a load resistor R3 connected to differential pairs 34 and 35. The differential pair 34 includes NPN transistors Q11 and Q12 supplied with an output signal from the intermediate frequency filter 24. The differential pair 35 includes NPN transistors Q13 and Q14 supplied with an output signal from the second frequency conversion circuit 28. The differential pair 36 includes NPN transistors Q15 and Q16, which selects one of the foregoing both differential pairs 34 and 35 according to a control signal from the switchover control circuit 29.

In the tuner circuit shown in FIG. 6, the voltage level of the control signal outputted from the switchover control circuit 29 is lower than the voltage level of bias voltage given to a base of the transistor Q15 of the differential pair 36. At that time, a base current flows through the transistor Q15; therefore, the differential pair 34 becomes an operating state. In this case, a signal from the intermediate frequency 24 is selected and amplified via the amplifier 27, and thereafter, outputted from the output terminal 26. At that time, no base current flows through the transistor Q16 of the differential pair 36; therefore, the differential pair 35 becomes a no-operating state.

Conversely, the voltage level of the control signal outputted from the switchover control circuit 29 becomes higher than the voltage level of bias voltage given to a base of the transistor Q15 of the differential pair 36. At that time, a base current flows through the transistor Q16; therefore, the differential pair 35 becomes an operating state. In this case, an output signal from the second frequency conversion circuit 28 is selected and amplified via the amplifier 27, and thereafter, outputted from the output terminal 26. At that time, no base current flows through the transistor Q15; therefore, the differential pair 34 becomes a no-operating state.

Second Embodiment

Figure 7:
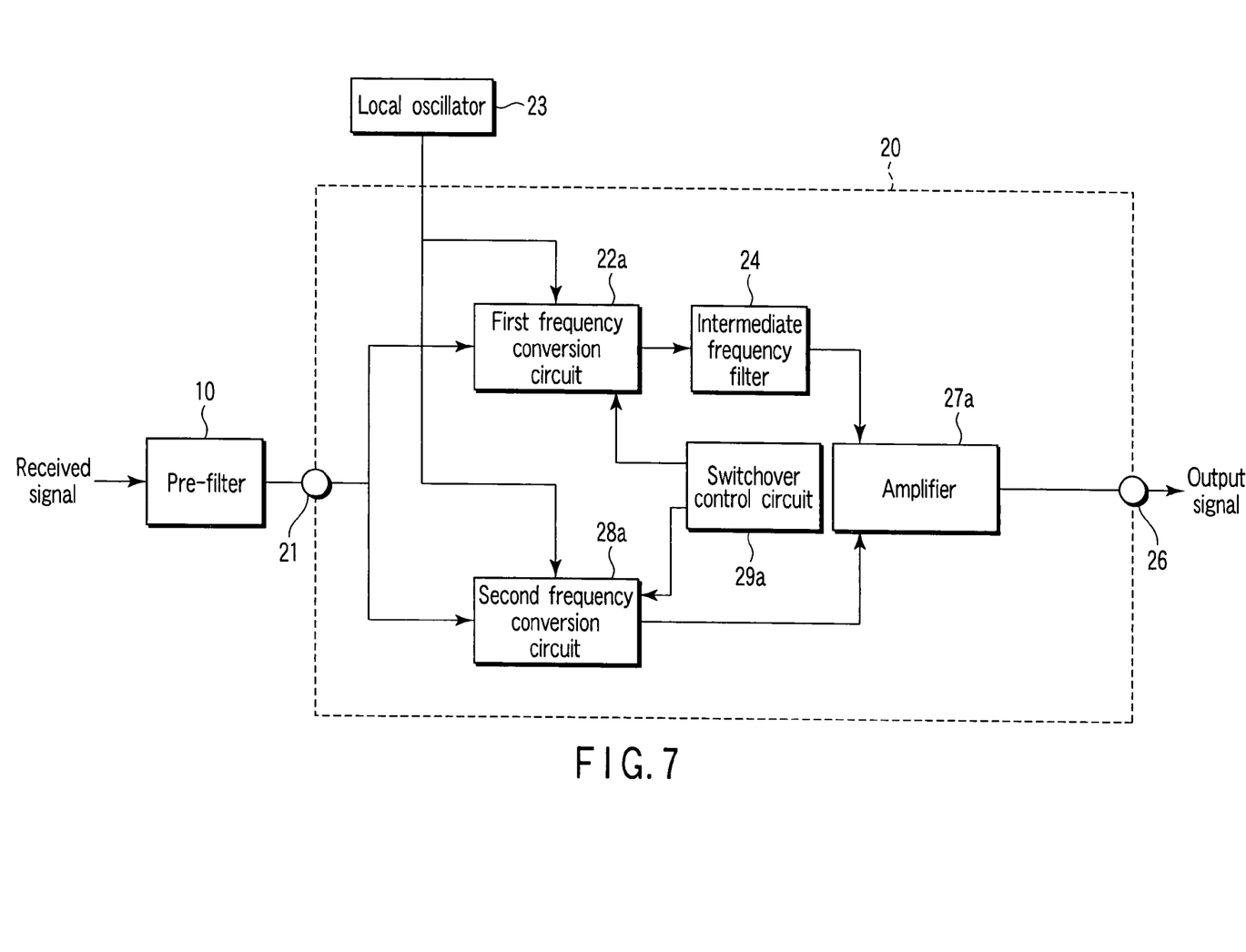
FIG. 7 is a block diagram showing a tuner circuit according to a second embodiment of the present invention.

FIG. 7 shows a tuner circuit according to a second embodiment of the present invention. The tuner circuit shown in FIG. 7 differs from that according to the first embodiment shown in FIG. 4 in the following points. Specifically, first and second frequency conversion circuits 22a and 28a each have the configuration such that the operating state is controlled according to control signals. A switchover control circuit 29a generates the foregoing control signals for controlling the operations of the first and second frequency conversion circuits 22a and 28a. An amplifier 27a adds and amplifies an output signal of an intermediate frequency filter 24 and that of the second frequency conversion circuit 28a, and thereafter, outputs it from the output terminal 26. The amplifier 27a amplifies either of the outputted signals from the intermediate frequency filter 24 or the second frequency conversion circuit 28a.

The foregoing configuration is provided, and thereby, the amplifier 27a has the following operation. The amplifier 27a amplifies either of the outputted signals, that is, intermediate frequency signal outputted from the intermediate frequency filter 24 or the output signal of the second frequency conversion circuit 28a.

According to the foregoing configuration of the tuner circuit of FIG. 7, the integrated circuit chip 20 is provided with first and second frequency conversion circuits 22a, 28a, intermediate frequency filter 24, amplifier 27a and switchover control circuit 29a. The local oscillator 23 is provided outside the integrated circuit chip 20. In this case, the following configuration may be employed. Specifically, the foregoing intermediate frequency filter 24 and switchover control circuit 29a are provided outside the integrated circuit chip 20 while the local oscillator 23 is provided therein.

The operation of the tuner circuit shown in FIG. 7 will be explained below. In a normal operation, the first frequency conversion circuit 22a is selected and operated according to the control signal while the second frequency conversion circuit 28a becomes a non-operating state. By doing so, the amplifier 27a amplifies and outputs a signal passing the first frequency conversion circuits 22a and the intermediate frequency filter 24. In this case, the same operation as the circuit of the first embodiment is made. In the normal operation, the frequency characteristic of a tuner output signal is given as shown FIG. 5C.

On the contrary, according to a control operation, the pass band characteristic of the pre-filter 10 is controlled while observing the frequency characteristic of the tuner output signal. In the control operation, the second frequency conversion circuit 28a is selected and operated according to a control signal outputted from the switchover control circuit 29a. On the other hand, the first frequency conversion circuit 22a becomes a non-operating state. By doing so, the amplifier 27a amplifies a through signal passing a path containing no frequency characteristic of the intermediate frequency filter 24. As a result, when the frequency characteristic of the tuner output signal outputted from the output terminal 26 is observed, the characteristic equivalent to the single characteristic of the pre-filter 10 shown in FIG. 5A is obtained. However, the frequency relationship is reversed to the characteristic of FIG. 5A in high and low, and the center frequency is different. In other words, the characteristic of the pre-filter 10 is observed using the tuner output signal outputted from the output terminal 26. By doing so, the work of controlling the output characteristic of the pre-filter 10 is readily done.

Figure 8:
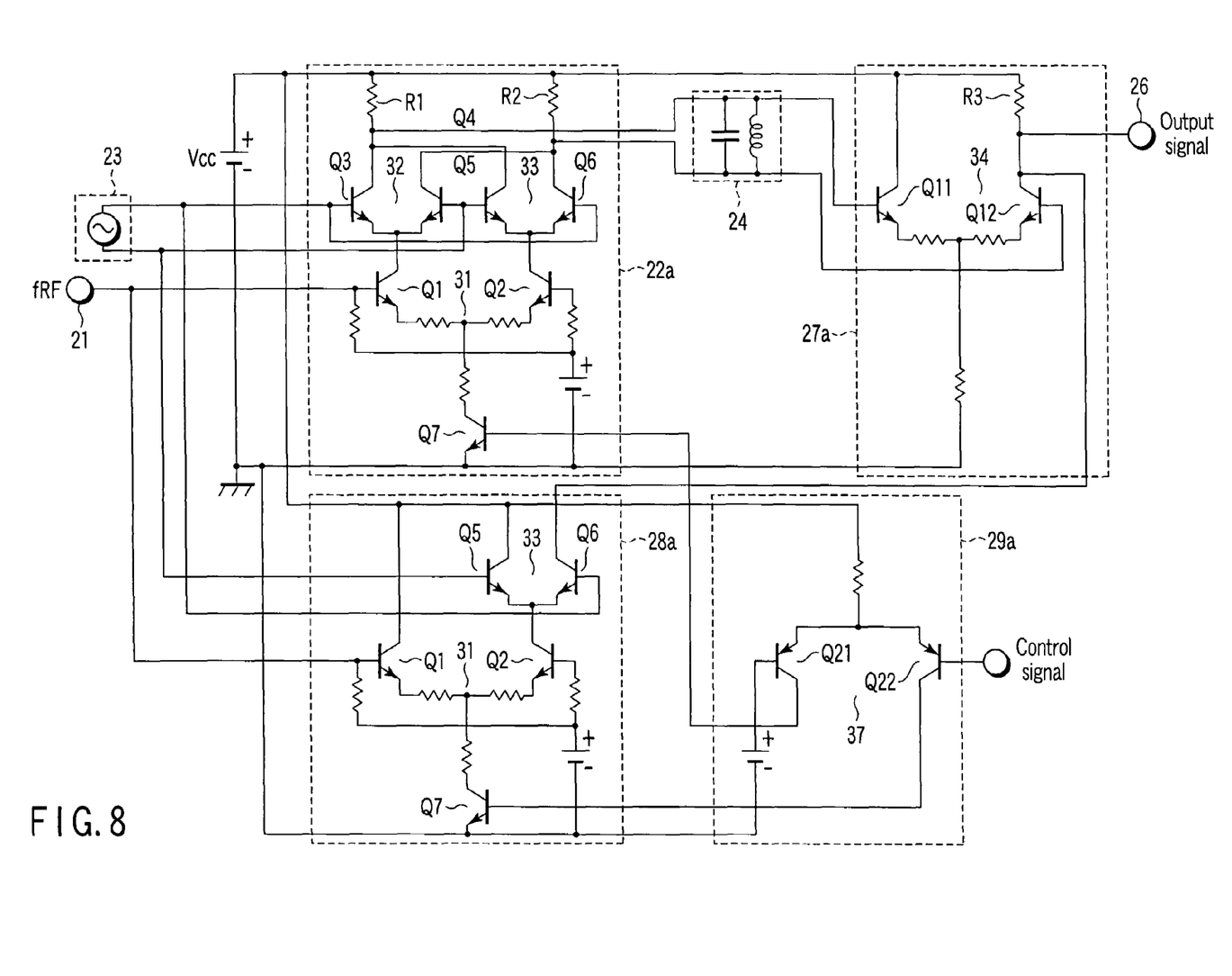
FIG. 8 is a block diagram showing the detailed configuration of the tuner circuit of FIG. 7.

FIG. 8 shows the detailed circuit configuration of the tuner circuit shown in FIG. 7. In FIG. 8, there are shown the input terminal 21, the first frequency conversion circuit 22a, a part of the local oscillator 23, the intermediate frequency filter 24, the output terminal 26, the amplifier 27a, the second frequency conversion circuit 28a and a part of the switchover control circuit 29a. In this case, the input terminal 21 is supplied with a high frequency signal selected via the pre-filter 10.

The first frequency conversion circuit 22a differs from the second circuit 22 shown in FIG. 6 in that it is newly provided with a transistor Q7 used as a current source. The collector-emitter path of the transistor Q7 is interposed between the differential pair 31 and a ground potential node. The base of the transistor Q7 is supplied with a first signal outputted from the switchover control circuit 29a. No collector current flows to the transistor Q7 when the first signal is not inputted to the base. Therefore, the whole operation of the first frequency conversion circuit 22a is stopped.

The intermediate frequency filter 24 includes a parallel resonance circuit composed of a capacitor and a coil, like that shown in FIG. 6.

The second frequency conversion circuit 28a differs from the second circuit 28 shown in FIG. 6 in that differential pair 32, load resistance elements R1 and R2 are omitted. The collector of one transistor Q1 of the differential pair 31 is connected to a supply node of power supply voltage Vcc. The collector of the other transistor Q2 of the differential pair 31 is connected to the differential pair 33. The collector of the transistor Q5 of the differential pair 33 is connected to the supply node of power supply voltage Vcc. The collector of the transistor Q6 of the differential pair 33 is connected to the amplifier 27a. The base of a transistor Q7 of the second frequency conversion circuit 28a is supplied with a second signal outputted from the switchover control circuit 29a. No collector current flows to the transistor Q7 of the second circuit 28a when the second signal is not inputted to the base. Therefore, the whole operation of the second frequency conversion circuit 28a is stopped.

The amplifier 27a differs from the amplifier 27 shown in FIG. 6 in that differential pairs 35 and 36 are omitted. Specifically, the amplifier 27a is composed of a differential pair 34 including NPN transistors Q11 and Q12, a load resistance element R3, and some resistance elements. The collector of the transistor Q6 of the second frequency conversion circuit 28a is connected to a common connection node of the collector of the transistor Q12 and the load resistance element R3. The collector of the transistor Q12 is connected with an output terminal 26. The amplifier 27a is a 2-input/1-output amplifier. The output signal of the intermediate frequency filter 24 is inputted to each base of transistors Q11 and Q12. A signal current from the second frequency conversion circuit 28a is inputted to the collector of the transistor Q12. By doing so, the signal from the intermediate frequency filter 24 and the signal current from the second circuit 28a are added together and amplified, and thereafter, outputted from the output terminal 26.

The switchover control circuit 29a has a differential pair 37 composed of PNP transistors Q21 and Q22. The base of one transistor Q21 is supplied with bias voltage while a switchover control signal is inputted to the base of the other transistor Q22.

When the switchover control signal is high level and the base voltage of the transistor Q22 is higher than that of the transistor Q21, collector current flows to the transistor Q21. The collector current is supplied as the first signal to the base of the transistor Q7 used as a current source in the first frequency conversion circuit 22a. In other words, the transistor Q7 of the first circuit 22a is supplied with base current; therefore, the first circuit 22a is operated. No collector current flows to the transistor Q22, and thus, no base current flows to the transistor Q7 used for current source of the second frequency conversion circuit 28a. Therefore, the second frequency conversion circuit 28a becomes a non-operating state.

When the switchover control signal is low level and the base voltage of the transistor Q22 is lower than that of the transistor Q21, collector current flows to the transistor Q22. The collector current is supplied as the second signal to the base of the transistor Q7 used as a current source in the second frequency conversion circuit 28a. In other words, the transistor Q7 of the second circuit 28a is supplied with base current; therefore, the second circuit 22a is operated. In this case, no collector current flows to the transistor Q21, and thus, no base current flows to the transistor Q7 used for current source of the first frequency conversion circuit 22a. Therefore, the first frequency conversion circuit 22a becomes a non-operating state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tuner circuit comprising:
    a pre-filter receiving a received high frequency signal, and outputting a high frequency signal having a desired frequency band;
    a local oscillator generating a local oscillation signal;
    a first frequency conversion circuit receiving a high frequency signal outputted from the pre-filter and the local oscillation signal to output a signal having a difference frequency component between said both signals;
    an intermediate frequency filter receiving an output signal of the first frequency conversion circuit, and selectively passing a signal having a desired intermediate frequency band to output an intermediate frequency signal;

a second frequency conversion circuit receiving a high frequency signal outputted from the pre-filter and the local oscillation signal to output a signal having a difference frequency component between said both signals; and an amplifier receiving the intermediate frequency signal and an output signal of the second frequency conversion circuit to select and amplify any one of said both signals, and thereafter, to output the selected and amplified signal.

2. The tuner circuit according to claim 1, wherein the first and second frequency conversion circuits, and the amplifier are formed on the same semiconductor chip.

3. The tuner circuit according to claim 1, wherein the first and second frequency conversion circuits each includes a double balance mixer circuit.

4. The tuner circuit according to claim 1, wherein the first and second frequency conversion circuits each includes:
   a first differential circuit receiving a high frequency signal outputted from the pre-filter;
   a second differential circuit connected to the first differential circuit, and supplied with the local oscillation signal;
   a third differential circuit connected to the first differential circuit, and supplied with the local oscillation signal; and
   a first load circuit connected the second and third differential circuits.

5. The tuner circuit according to claim 1, wherein the intermediate frequency filter includes a parallel resonance circuit composed of a capacitor and a coil.

6. The tuner circuit according to claim 1, further comprising:
   a control circuit outputting a control signal to control the amplifier.

7. The tuner circuit according to claim 6, wherein the amplifier includes:
   a fourth differential circuit receiving the control signal;
   a fifth differential circuit connected to the fourth differential circuit, and receiving a high frequency signal outputted from the pre-filter;
   a sixth differential circuit connected to the fourth differential circuit, and receiving an output signal outputted from the second frequency conversion circuit; and
   a second load circuit connected the fifth and sixth differential circuits.

8. A tuner circuit comprising:
   a pre-filter receiving a received high frequency signal, and outputting a high frequency signal having a desired frequency band;
   a local oscillator generating a local oscillation signal;
   a first frequency conversion circuit receiving a high frequency signal outputted from the pre-filter and the local oscillation signal, the operation of the first frequency conversion circuit being controlled according to a first signal, and the operation of the first frequency conversion circuit being output a signal having a difference frequency component between the high frequency signal outputted from the pre-filter and the local oscillation signal;
   a second frequency conversion circuit receiving a high frequency signal outputted from the pre-filter and the local oscillation signal, the operation of the second frequency conversion circuit being controlled according to a second signal, and the second frequency conversion circuit being output a signal having a difference frequency component between the high frequency signal outputted from the pre-filter and the local oscillation signal;
   an intermediate frequency filter receiving an output signal of the first frequency conversion circuit, and selectively passing a signal having a desired intermediate frequency band to output an intermediate frequency signal; and
   an amplifier receiving the intermediate frequency signal and an output signal of the second frequency conversion circuit to add and amplify said both signals, and thereafter, to output them.

9. The tuner circuit according to claim 8, wherein the first and second frequency conversion circuits, and the amplifier are formed on the same semiconductor chip.

10. The tuner circuit according to claim 8, wherein the first and second frequency conversion circuits each includes a double balance mixer circuit.

11. The tuner circuit according to claim 8, wherein the first and second frequency conversion circuits each includes:
    a first differential circuit receiving a high frequency signal outputted from the pre-filter;
    a second differential circuit connected to the first differential circuit, and supplied with the local oscillation signal;
    a third differential circuit connected to the first differential circuit, and supplied with the local oscillation signal;
    a first load circuit connected the second and third differential circuits; and
    a transistor connected to the first differential circuit to supply a current to the first differential circuit in accordance with one of the first and second signals.

12. The tuner circuit according to claim 8, wherein the amplifier includes:
    a fourth differential circuit receiving a high frequency signal outputted from the pre-filter; and
    a second load circuit connected the fourth differential circuit and the second frequency conversion circuit.

13. The tuner circuit according to claim 8, further comprising:
    a control circuit outputting the first and second signals.

14. A television tuner circuit comprising:
    a pre-filter receiving a received television signal, and outputting a high frequency signal having a desired frequency band;
    a local oscillator generating a local oscillation signal;
    a first frequency conversion circuit receiving a high frequency signal outputted from the pre-filter and the local oscillation signal to output a signal having a difference frequency component between said both signals;
    an intermediate frequency filter receiving an output signal of the first frequency conversion circuit, and selectively passing a signal having a desired intermediate frequency band to output an intermediate frequency signal;
    a second frequency conversion circuit receiving a high frequency signal outputted from the pre-filter and the local oscillation signal to output a signal having a difference frequency component between said both signals; and
    an amplifier receiving the intermediate frequency signal and an output signal of the second frequency conversion circuit to select and amplify any one of said both signals, and thereafter, to output the selected and amplified signal.

15. The tuner circuit according to claim 14, wherein the first and second frequency conversion circuits, and the amplifier are formed on the same semiconductor chip.

16. The tuner circuit according to claim 14, wherein the first and second frequency conversion circuits each includes a double balance mixer circuit.

17. The tuner circuit according to claim 14, wherein the first and second frequency conversion circuits each includes:
- a first differential circuit receiving a high frequency signal outputted from the pre-filter;
- a second differential circuit connected to the first differential circuit, and supplied with the local oscillation signal;
- a third differential circuit connected to the first differential circuit, and supplied with the local oscillation signal; and
- a first load circuit connected the second and third differential circuits.

18. The tuner circuit according to claim 14, wherein the intermediate frequency filter includes a parallel resonance circuit composed of a capacitor and a coil.

19. The tuner circuit according to claim 14, further comprising:
- a control circuit outputting a control signal to control the amplifier.

20. The tuner circuit according to claim 19, wherein the amplifier includes:
- a fourth differential circuit receiving the control signal;
- a fifth differential circuit connected to the fourth differential circuit, and receiving a high frequency signal outputted from the pre-filter;
- a sixth differential circuit connected to the fourth differential circuit, and receiving an output signal outputted from the second frequency conversion circuit; and
- a second load circuit connected the fifth and sixth differential circuits.

* * * * *